Figure 1:
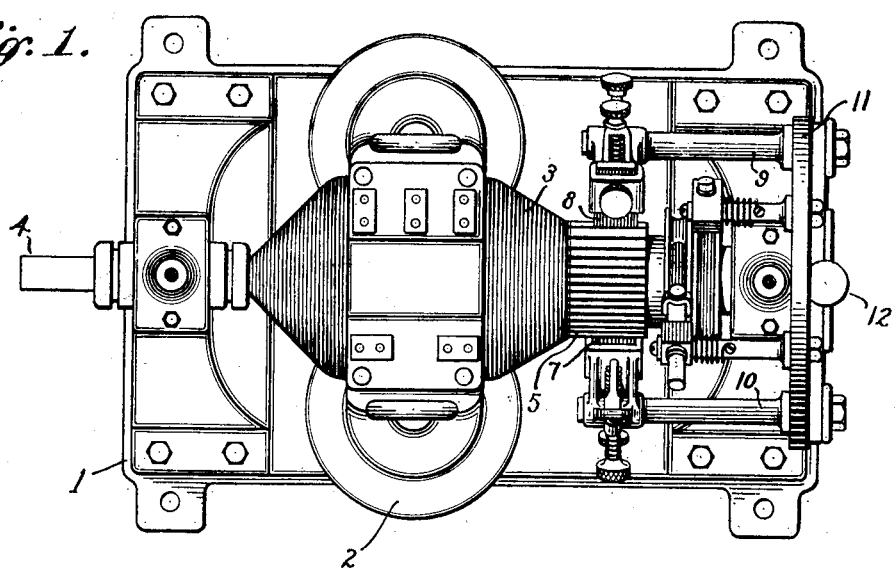

No. 665,486. Patented Jan. 8, 1901.
E. THOMSON.
DYNAMO ELECTRIC MACHINE.
(Application filed Oct. 25, 1900.)
(No Model.) 2 Sheets—Sheet 1.

WITNESSES:
Rollin Abell
Dugald McKillop

INVENTOR:
Elihu Thomson
by Albert G. Davis
Atty.

No. 665,486. Patented Jan. 8, 1901.
E. THOMSON.
DYNAMO ELECTRIC MACHINE.
(Application filed Oct. 25, 1900.)

(No Model.) 2 Sheets—Sheet 2.

WITNESSES:
Rollin Abell
Dougald McKillop

INVENTOR:
Elihu Thomson
by Albert G. Davis
Atty.

THE NORRIS PETERS CO., PHOTO-LITHO., WASHINGTON, D. C.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

DYNAMO-ELECTRIC MACHINE.

SPECIFICATION forming part of Letters Patent No. 665,486, dated January 8, 1901.

Application filed October 25, 1900. Serial No. 34,303. (No model.)

*To all whom it may concern:*

Be it known that I, ELIHU THOMSON, a citizen of the United States, residing at Swampscott, in the county of Essex, State of Massachusetts, have invented certain new and useful Improvements in Dynamo-Electric Machines, (Case No. 1,109,) of which the following is a specification.

Single-phase alternating-current machines may be provided with commutators and when so constructed are capable of a variety of modes of operation. Thus, for example, they may be driven by mechanical power and deliver both alternating and direct current, or they may be used to convert alternating current into direct current, or the reverse. In all of these cases, however, such machines as ordinarily built are open to the objection of more or less serious sparking at the commutator, this sparking being due to the fact that the current in coils undergoing commutation is not uniform during a revolution, while at the same time the resultant armature reaction varies, thereby varying the field strength under the pole-tips. It is thus impossible to find a fixed position for the commutator-brushes such as will result in the suppression of sparking. The conditions require that the brushes should be moved back and forth on the commutator or oscillated during each revolution, so that the coils of the armature as they pass under the brush may be in a position with respect to the field of the machine such as will induce therein an electromotive force which will more or less balance that produced as the coil passes out from under the brush. If the machine is operated as a rotary converter, for example, the brushes during one portion of the revolution would require to have a positive lead and at other times a negative lead corresponding to the alternating generator and motor action in the machine. To illustrate, suppose the machine to be driven by direct current, thereby acting as an inverted rotary converter, then when the alternating wave is at a maximum the lead of the brushes will be a generator lead, while when the alternating current is zero the lead should be a maximum negative or motor lead. According to my present invention I obtain this effect by constructing the commutator with segments of various widths, the segments being spaced close together in some portions of the commutator and wide apart at others. The commutator being revolved at a uniform angular velocity thereby causes what amounts to a variable velocity of the segments, whereby armature-coils in advance of a neutral position first undergo commutation and then coils behind this position similarly undergo commutation. By this arrangement the several armature-coils may be caused to pass under the commutator-brushes at times during their revolution when the least sparking will take place due to commutation.

The construction and mode of operation of my invention will better be understood by reference to the following description, taken in connection with the accompanying drawings.

The scope of the invention will be particularly pointed out in the claims appended hereto.

Figure 2:
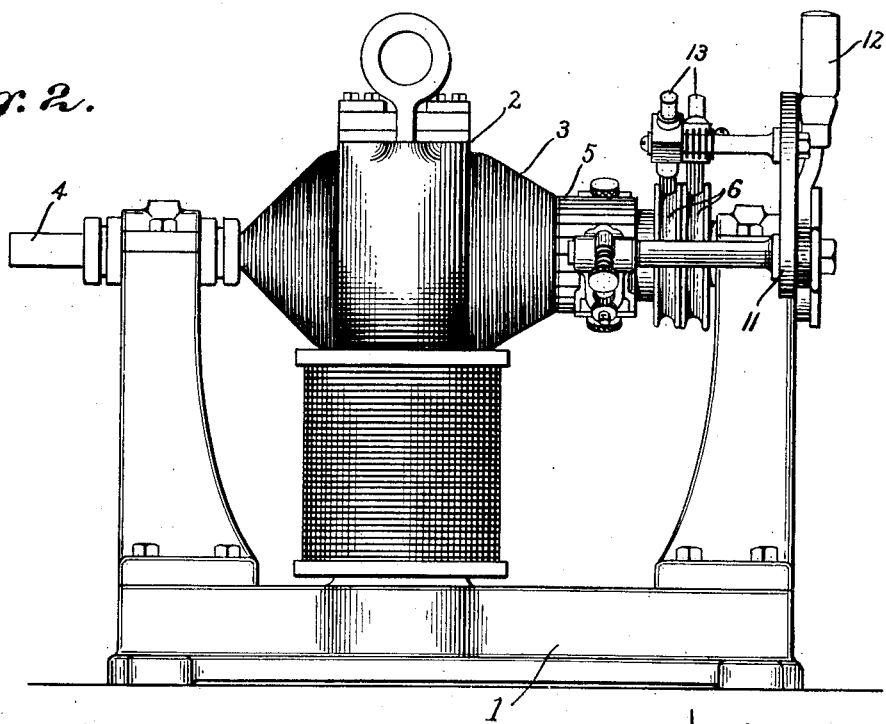
Figure 3:
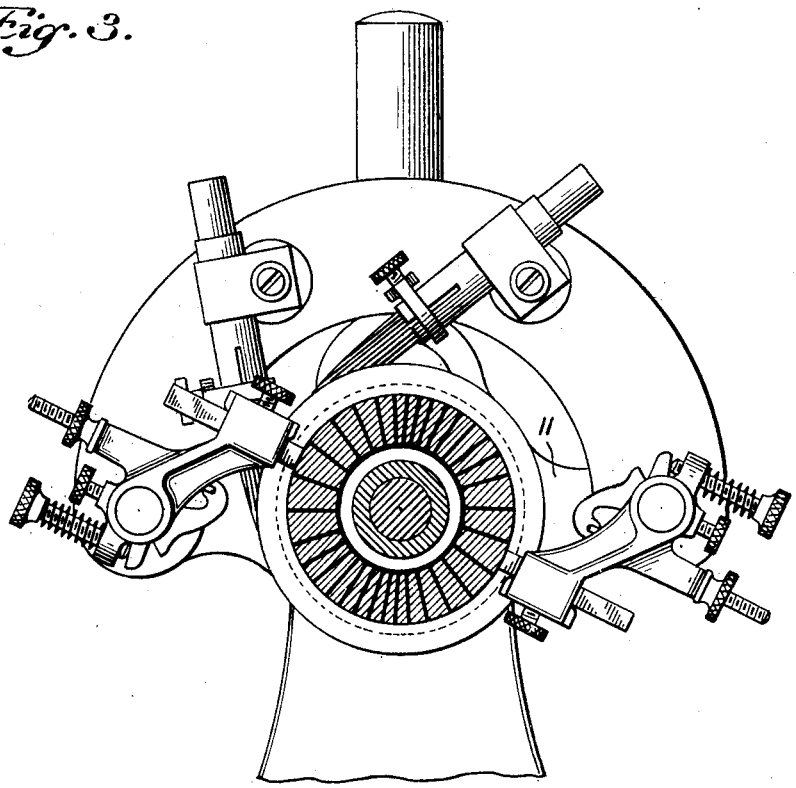

In the drawings, Figure 1 represents a plan view of a machine embodying my invention. Fig. 2 is a side elevation of the same; Fig. 3, a sectional view taken through the commutator of the machine, and Fig. 4 a detail.

The machine which I have illustrated in the drawings as representing one embodiment of my invention is in most respects identical in structure with an ordinary direct-current motor. It differs therefrom, however, in being provided with collector-rings and with a commutator of somewhat different structure than that ordinarily used in a direct-current machine.

In Figs. 1 and 2 the base-plate of the machine is shown at 1. Upon this base-plate is mounted the field-magnet structure 2 of ordinary construction. This structure is of the bipolar type, between the poles of which is mounted the armature 3, the shaft 4 of which rotates in the usual way in bearings carried by the base-plate of the machine. The armature is provided with a commutator 5 of a novel character, which will be further described hereinafter. Two collector-rings 6 are also provided and are connected in any well-understood manner to points in the armature-winding displaced from each other by a semicircumference. In case the machine be multipolar the points of connection between the collector-rings and the armature-winding would be made to correspond in a manner well understood in connection with multipolar machines.

Commutator-brushes 7 and 8, mounted in any suitable manner, bear upon the commutator. The brush-holders carrying the commutator-brushes are mounted upon rods 9 and 10, respectively, these rods being bolted to a yoke 11, arranged so as to be shifted at will about the armature-shaft as an axis, an operating-handle 12 being provided for this purpose. This movement permits proper adjustment of the brushes upon the commutator. The brushes 13, bearing upon the collector-rings 6, are also carried by projecting rods bolted to the brush-holder yoke, as will readily be seen from an inspection of Figs. 1 and 2 of the drawings and also from an inspection of Fig. 3, in which the commutator-brushes and the brushes bearing upon the collector-rings are shown somewhat more in detail.

In Fig. 3 a sectional view of the commutator is shown, from which it will be seen that the segments near some portions of the periphery are crowded together, while at other portions they are given a wider spacing. As has been stated heretofore, the object of this spacing is to obtain a result equivalent to an automatic shifting of the commutator-brushes back and forth, thereby obtaining the advantages due to a periodic shifting of the diameter of commutation. A better understanding of the operation of the commutator and of the advantages incident thereto will be had by reference to Fig. 4, which represents in diagram the armature-winding and its commutator associated with the poles of the field-magnets and provided, of course, with collector-rings and commutator-brushes. For convenience the armature-winding is represented at 14 as of the Gramme type, although it will of course be understood that the winding may and ordinarily will be the drum-winding usual in practice. This winding 14 is located in operative relation to field-poles, (indicated diagrammatically at 15 and 16.) The machine is provided with collector-rings, (indicated in the diagram at 17,) these collector-rings being connected, respectively, to opposite points 18 and 19 in the armature-winding. Commutator-brushes 20 and 21 bear upon the commutator indicated generally by the numeral 22, the segments of this commutator being connected in the usual manner to equally-spaced points in the winding 14. Unlike the ordinary commutator, however, the segments are of unlike width, those lying in the regions 23 and 24 being crowded together, while elsewhere the spacing is wider. The effect of this varying width of the segments is to cause some of the segments to be connected to points in the winding lying on approximately the same radius as these segments, while other segments are connected to points on the winding which, by reason of the spacing referred to, are angularly displaced from the segments to which they are connected. The spacing is so chosen that as the armature revolves the commutator-brushes will during a single revolution first commutate current in a coil lying midway between the pole-pieces, then in a coil lying in a position advanced in the direction of rotation from this middle position, then gradually back again step by step to a coil lying midway between the pole-pieces, and from this position commutation takes place successively in coils lying in positions displaced by greater and greater angles measured from the middle position between the pole-pieces in a direction against the direction of rotation of the armature. The cycle of operation is completed by a step-by-step return to the position of the diameter of commutation at starting, which, as will be remembered, corresponded to a coil midway between the field-poles. The result of this spacing is thereby to produce an effect equivalent to an oscillation of the brushes on a commutator of the ordinary type, the result being due in this case not to an actual shifting of the brushes, but to an apparent variation in angular velocity of the commutator-segments. The utility of this shifting back and forth of the point of commutation is particularly valuable in commutating-machines in which direct current and single-phase alternating current flow between the armature and suitable coöperating collector-rings and commutator. A machine of this type may operate either as a rotary converter to change a single-phase alternating current into direct current or as an inverted rotary to produce the opposite transformation. The machine in either case may or may not operate to produce mechanical power as well.

Figure 4:
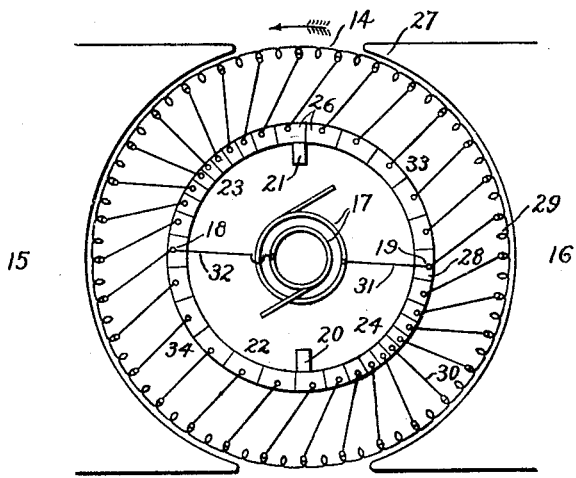

To illustrate the operation of my invention specifically, let it be supposed that the machine represented by diagram in Fig. 4 operates as an inverted rotary to change direct current into single-phase alternating current. As a starting-point, let it be assumed that the alternating leads are joined to points in the armature-winding lying on a diameter in line with the field magnetization. The alternating electromotive force at this instant, phase displacement being neglected, will be zero. At this instant, therefore, the current flowing in the armature-winding is merely the direct current supplied to the machine, and the machine is therefore acting in this instance as a motor. In order to prevent sparking of the commutator-brushes 20 and 21, it is necessary, therefore, that the coils undergoing commutation shall lie in a position near the pole-corners, out from under which they emerge during rotation. Thus supposing the direction of rotation to be as indicated by the arrow in Fig. 4, then the commutator-segments 26, which are short-circuited by the brush 21 during the act of commutation, are connected to an armature-coil lying in a position under the trailing-pole corner 27. In ordinary practice this result is attained by shifting the commutator-brushes backward against the direction of rotation of the armature. As the armature-winding 14 and its commutator revolve the commutator-segments pass under the brushes one by one, in the course of which operation the leads 18 and 19 are revolved until the conductors 31 and 32, to which they are connected, lie upon a line midway between the pole-pieces. When this position is reached, the alternating current is a maximum, and if the machine is used merely to convert direct current into single-phase alternating without the production of mechanical power the instantaneous value of the alternating current will at this time usually be equal to some value approximating a maximum of twice that of the direct current. In the neighborhood of this position of the alternating leads the machine therefore acts as a generator, in which case the point of commutation must be shifted forward in the direction of rotation in order to prevent sparking in the manner already well understood. This result is effected by reason of the wide spacing of the commutator-segments lying within opposite quadrants of the commutator, as at 33 and 34. The result of this spacing is that when the segment 28 comes under the brush 21 the brush then commutates current in a coil 29, situated at a considerable angle in advance of a middle position between the pole-pieces. The result is equivalent to a forward shifting of the brushes on an ordinary commutator, and for this reason sparking at the commutator is prevented. As the commutator revolves away from the position noted the segments shorten up and the angular displacement of the coils decreases until it becomes zero at or about the point 30, and then increases in the opposite direction, corresponding to a shifting backward of the diameter of commutation. The cycle of operation is finally completed by the return of the commutator-brush to its original position on the commutator. The operation described goes on continuously, as will readily be understood. It will of course be obvious that the spacing of the commutator will vary according to the amount of shifting of the diameter of commutation desired, this in turn being dependent upon the design of the machine, so that no set rule can be given for laying out the spacing, except that the segments at one position of the periphery are crowded together and at other portions more widely spaced, as in the manner set forth by way of example in Fig. 4.

What I claim as new, and desire to secure by Letters Patent of the United States, is—

1. A commutator the segments of which differ in width, an armature, and connections between said segments and conductors on said armature.

2. A commutator having segments crowded together in a certain portion of its periphery and more widely spaced in another portion of the periphery.

3. A commutator having segments of progressively varying width.

4. The combination of an armature-winding, and a commutator having segments of different widths connected to said winding.

5. The combination of an armature-winding, collector-rings connected to said winding, and a commutator having unequally-spaced segments also connected to said winding.

6. The combination, in a single-phase alternating-current dynamo-electric machine, of an armature, collector-rings connected in single-phase relation to said armature, and a commutator having unequally-spaced segments also connected to said armature.

7. In a dynamo-electric machine, the combination of two relatively rotating members one of which is provided with commutator-brushes, the other member having a commutator coöperating with said brushes, and a winding connected to said commutator the segments of which are so spaced with reference to the points of connection to said winding as to cause a periodic shifting of the diameter of commutation.

In witness whereof I have hereunto set my hand this 23d day of October, 1900.

ELIHU THOMSON.

Witnesses:
DUGALD McKILLOP,
HENRY O. WESTENDARP.